United States Patent
Drillet et al.

(10) Patent No.: US 12,398,438 B2
(45) Date of Patent: Aug. 26, 2025

(54) PROCESS FOR MANUFACTURING A PRESS HARDENED LASER WELDED STEEL PART

(71) Applicant: ArcelorMittal, Luxembourg (LU)

(72) Inventors: Pascal Drillet, Rozerieulles (FR); Maria Poirier, Villers Saint-Paul (FR); Sujay Sarkar, Metz (FR)

(73) Assignee: ArcelorMittal, Luxembourg (LU)

( * ) Notice: Subject to any disclaimer, the term of this patent is extended or adjusted under 35 U.S.C. 154(b) by 93 days.

(21) Appl. No.: 18/377,943

(22) Filed: Oct. 9, 2023

(65) Prior Publication Data

US 2024/0035109 A1    Feb. 1, 2024

Related U.S. Application Data

(62) Division of application No. 17/491,785, filed on Oct. 1, 2021, now Pat. No. 11,814,696, which is a division
(Continued)

(30) Foreign Application Priority Data

Jul. 9, 2015    (WO) .................. PCT/IB2015/001156

(51) Int. Cl.
*B23K 26/21* (2014.01)
*B21B 1/22* (2006.01)
(Continued)

(52) U.S. Cl.
CPC .................. *C21D 9/46* (2013.01); *B21B 1/22* (2013.01); *B21D 22/022* (2013.01); *B23K 26/02* (2013.01); *B23K 26/21* (2015.10); *B32B 15/012* (2013.01); *C21D 1/673* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C22C 21/02* (2013.01); *C22C 38/001* (2013.01); *C22C 38/002* (2013.01); *C22C 38/02* (2013.01); *C22C 38/06* (2013.01); *C22C 38/22* (2013.01); *C22C 38/26* (2013.01); *C22C 38/28* (2013.01); *C22C 38/32* (2013.01); *C22C 38/38* (2013.01); *C22C 38/44* (2013.01); *C22C 38/46* (2013.01); *C22C 38/48* (2013.01); *C22C 38/50* (2013.01); *C22C 38/54* (2013.01); *C23C 2/12* (2013.01); *B21B 2001/225* (2013.01);
(Continued)

(58) Field of Classification Search
CPC ....................................................... B23K 26/21
See application file for complete search history.

(56) References Cited

U.S. PATENT DOCUMENTS

| 6,059,899 A | 5/2000 | Shibata et al. |
| 6,296,805 B1 | 10/2001 | Laurent et al. |
| (Continued) | | |

FOREIGN PATENT DOCUMENTS

| CA | 2880946 | 2/2014 |
| CA | 2916123 A1 | 1/2015 |
| (Continued) | | |

OTHER PUBLICATIONS

Salzgitter Flachstahl. 22Mn85 Boronalloyed quenched and tempered steel. 2014. [retrieved on Dec. 28, 2021]. Retrieved from the Internet: <URL: https://www.salzgitter-flachstahl.de/fileadmin/mediadb/szfg/informationsmaterial/produktinformationen/warmgewalzte_produkte/eng/22mnb5.pdf>. (Year: 2014).

(Continued)

*Primary Examiner* — Jophy S. Koshy
(74) *Attorney, Agent, or Firm* — Davidson Kappel LLC

(57) ABSTRACT

A process for manufacturing a press hardened laser welded steel part, includes providing at least one first steel sheet with a composition containing, by weight $0.062 \leq C \leq 0.095\%$, the at least one first steel sheet precoated with a metallic precoating of aluminum, or aluminum-based alloy, or aluminum alloy.

providing at least one second steel sheet with a composition containing, by weight, from to 0.38% of carbon, the at least one second steel sheet precoated with a metallic precoating of aluminum, or aluminum-based alloy, or aluminum alloy;

removing a portion of a thickness of the aluminum precoating at upper and lower sides along one side of a periphery of the at least one first steel sheet and the at least one second steel sheet;

creating a welded blank by laser welding the at least one first steel sheet and the at least one second steel sheet, such that an aluminum content in a weld metal is lower than 0.3% by weight, the laser welding being performed along the periphery wherein the portion of the thickness of the aluminum precoating has been removed;

heating the welded blank and holding the welded blank at a temperature Tm between 890 and 950° C., a holding duration Dm at the temperature being between 1 and 10 minutes, so as to obtain a heated welded blank;

transferring the heated welded blank within a forming press, the transfer duration Dt being less than 10 s;

hot forming the heated welded blank in the forming press so as to obtain a welded formed part; and cooling the welded formed part at a first cooling rate CR1 between 40 and 360° C./s in a temperature range between 750 and 450° C., and at a second cooling rate CR2 between 15 to 150° C./s in a temperature range between 450° C. and 250° C., wherein CR2<CR1.

11 Claims, 4 Drawing Sheets

Related U.S. Application Data of application No. 15/741,290, filed as application No. PCT/IB2016/000788 on Jun. 10, 2016, now Pat. No. 11,319,610.

(51) Int. Cl.

| | | |
|---|---|---|
| B21D 22/02 | (2006.01) | |
| B23K 26/02 | (2014.01) | |
| B32B 15/01 | (2006.01) | |
| C21D 1/673 | (2006.01) | |
| C21D 6/00 | (2006.01) | |
| C21D 8/02 | (2006.01) | |
| C21D 9/46 | (2006.01) | |
| C22C 21/02 | (2006.01) | |
| C22C 38/00 | (2006.01) | |
| C22C 38/02 | (2006.01) | |
| C22C 38/06 | (2006.01) | |
| C22C 38/22 | (2006.01) | |
| C22C 38/26 | (2006.01) | |
| C22C 38/28 | (2006.01) | |
| C22C 38/32 | (2006.01) | |
| C22C 38/38 | (2006.01) | |
| C22C 38/44 | (2006.01) | |
| C22C 38/46 | (2006.01) | |
| C22C 38/48 | (2006.01) | |
| C22C 38/50 | (2006.01) | |
| C22C 38/54 | (2006.01) | |
| C23C 2/12 | (2006.01) | |

(52) U.S. Cl.
CPC .... B32B 2605/00 (2013.01); C21D 2211/001 (2013.01); C21D 2211/002 (2013.01); C21D 2211/005 (2013.01); C21D 2211/008 (2013.01)

(56) References Cited

U.S. PATENT DOCUMENTS

| | | |
|---|---|---|
| 8,722,203 B2 | 5/2014 | Laurent et al. |
| 8,747,578 B2 | 6/2014 | Toyoda et al. |
| 8,888,933 B2 | 11/2014 | Hayashi et al. |
| 9,605,329 B2 | 3/2017 | Nonaka et al. |
| 9,920,408 B2 | 3/2018 | Nam et al. |
| 2003/0190493 A1 | 10/2003 | Nomura et al. |
| 2005/0173031 A1 | 8/2005 | Hasegawa |
| 2006/0108035 A1 | 5/2006 | Sun et al. |
| 2009/0238715 A1 | 9/2009 | Cho et al. |
| 2010/0186854 A1 | 7/2010 | Bertrand et al. |
| 2010/0193081 A1 | 8/2010 | Mataigne et al. |
| 2010/0221572 A1 | 9/2010 | Laurent et al. |
| 2010/0282374 A1 | 11/2010 | Mataigne et al. |
| 2013/0333190 A1 | 12/2013 | Mizumura et al. |
| 2014/0037980 A1 | 2/2014 | Kawasaki |
| 2014/0102597 A1 | 4/2014 | Ono et al. |
| 2015/0275339 A1 | 10/2015 | Aratani et al. |
| 2015/0284819 A1 | 10/2015 | Tamaki et al. |
| 2016/0130675 A1 | 5/2016 | Muetze et al. |
| 2017/0029914 A1 | 2/2017 | Hayashi et al. |
| 2017/0260599 A1 | 9/2017 | Puerto Velasquez et al. |
| 2017/0341187 A1 | 11/2017 | Cretteur et al. |
| 2019/0106765 A1 | 4/2019 | Moulin et al. |

FOREIGN PATENT DOCUMENTS

| | | |
|---|---|---|
| CA | 2916941 | 3/2015 |
| CN | 1412333 A | 4/2003 |
| CN | 1752261 | 3/2006 |
| CN | 1890394 | 1/2007 |
| CN | 101250618 | 8/2008 |
| CN | 101280352 A | 10/2008 |
| CN | 101545071 A | 9/2009 |
| CN | 101631880 | 1/2010 |
| CN | 101660097 | 3/2010 |
| CN | 101688284 A | 3/2010 |
| CN | 101809182 A | 8/2010 |
| CN | 102021482 | 4/2011 |
| CN | 102037150 A | 4/2011 |
| CN | 102301027 | 12/2011 |
| CN | 102782173 | 11/2012 |
| CN | 103534375 | 1/2014 |
| CN | 103917329 | 7/2014 |
| CN | 104411846 | 3/2015 |
| DE | 2452486 A1 | 5/1975 |
| EP | 1865086 | 12/2007 |
| EP | 1881083 | 1/2008 |
| EP | 2137327 B1 | 5/2012 |
| EP | 2708613 A1 | 3/2014 |
| FR | 2780984 | 1/2000 |
| GB | 1490535 | 11/1977 |
| JP | S63213619 A | 9/1988 |
| JP | 2004025247 | 1/2004 |
| JP | 2006200020 | 8/2006 |
| JP | 2010070800 A | 4/2010 |
| JP | 2010174275 | 8/2010 |
| JP | WO2013105632 | 5/2015 |
| JP | 2016503456 | 2/2016 |
| KR | 20130046941 A | 5/2013 |
| KR | 20130055240 A | 5/2013 |
| KR | 20130140169 A | 12/2013 |
| KR | 20140031752 A | 3/2014 |
| KR | 20140047960 A | 4/2014 |
| RU | 2470087 C2 | 12/2012 |
| RU | 2485202 C1 | 6/2013 |
| WO | WO2014027682 | 2/2014 |
| WO | WO2014037627 | 3/2014 |
| WO | WO2015080242 A1 | 6/2015 |

OTHER PUBLICATIONS

"Steel for hot stamping-Usibor, extract from the product catalogue—European edition", Arcelor Mittal, Jan. 28, 2014 (Jan. 28, 2014), p. 9PP, XP002755755, Retrieved from the Internet: URL:http://automotive.arcelormittal.comjsa turnus/sheets/E EN.pdf [retrieved on 2816-03-22] the whole document.

R. Vierstraete, W. Ehling, F. Pinard, L.Cretteur, A. Pic, Q. Yin: "Laser ablation for hardening laser welded steel blanks", Industrial Laser Solution for Manufacturing, Jan. 26, 2010 (Jan. 26, 2010), pp. 1-13, XP002755756, Tulsa Retrieved from the Internet: URL:www.industrial-lasers.com/articles/2010/01/laser-ablation . . . [retrieved on Mar. 21, 2016].

P. Norman, G. Wiklund, P. Janiak. N. Malmberg. A.F.H. Kaplan: "Comparison of 22MnB5-steel with and without AlSi-coating during laser hybrid arc welding". Norwegian University of Science and Technology. Jun. 29, 2011 (Jun. 29, 2011), pp. 1-9, XP002755757, Trondheim the whole document.

Anonymous: "Update Client magaziner Flat Carbon Europe". ArcelorMittal, Nov. 2011 (Nov. 2011). XP002755758, Retrieved from the Internet: URL:http://flateurope.arcelormittal.com/flipflopjfcejUpdate/ENUpdateFCE November11/ index.html—[retrieved on Mar. 22, 2016] the whole document.

International Search Report PCT/IB2016/000788.

PROCESS FOR MANUFACTURING A PRESS HARDENED LASER WELDED STEEL PART

This is a Divisional of U.S. patent application Ser. No. 17/491,785, filed Oct. 1, 2021, no published as US 2022/0017987, which is a Divisional of U.S. patent application Ser. No. 15/741,290, filed Jan. 2, 2018, now patented as U.S. Pat. No. 11,319,610, which is a National Phase of International Patent Application PCT/IB2016/000788, filed Jun. 10, 2016, which claims priority to International Patent Application PCT/IB2015/001156, filed Jul. 9, 2015, all of which are hereby incorporated by reference herein.

The present invention relates to methods for steel parts that are hot formed and press hardened through a cooling step achieved by holding the parts in the press tool. These parts are used as structural elements in automotive vehicles for anti-intrusion or energy absorption functions. Such parts can also be used for example for the fabrication of tools or parts for agricultural machinery.

BACKGROUND

In such type of applications, it is desirable to have steel parts that combine high mechanical strength, high impact resistance, good corrosion resistance and dimensional accuracy. This combination is particularly desirable in the automobile industry. Automotive parts such as front or rear rails, roof rails, B-pillars, and chassis parts such as lower control arms, engine cradles, need more particularly these properties.

The press hardening process has been disclosed in the publication GB1490 535. A hardened steel part is obtained by heating a steel blank to a temperature at which the steel is transformed into austenite and then hot formed in a press. The blank is simultaneously rapidly cooled in the press tool and held so to prevent distortion thus obtaining a martensitic and/or bainitic microstructure. The steel used may have the following composition: C<0.4%, 0.5-2.0% Mn, S and P<0.05, 0.1-0.5% Cr, 0.05-0.5% Mo, <0.1% Ti, 0.005-0.01% B, <0.1% Al. However, this publication does not provide a solution for obtaining simultaneously high mechanical resistance and elongation, good bendability and weldability.

The fabrication of parts with good corrosion resistance and tensile strength higher than 1500 MPa is disclosed by the publication FR2780984: an aluminized steel sheet with 0.15-0.5% C, 0.5-3% Mn, 0.1-0.5% Si, 0.01-1% Cr, <0.2% Ti, 0.1% Al and P, <0.05% S, 0.0005-0.08% B, is heated, formed and rapidly cooled. However, due to the high tensile strength level, the total elongation in tensile test is lower than 6%.

The publication EP2137327 discloses the press hardening of a steel blank with a composition containing: 0.040-0.100% C, 0.80-2.00% Mn, <0.30% Si, <0.005% S, <0.030% P, Al, 0.015-0.100% Al, 0.030-0.080% Ti, <0.009% N, <0.100% Cu, Ni, Mo, <0.006% Ca. After press hardening, a tensile strength higher than 500 MPa can be obtained. However, due to the nature of the microstructure, which is equiaxed ferrite, it is not possible to achieve very high tensile strength level.

The document EP1865086 discloses a steel composition comprising 0.1-0.2% C, 0.05-0.3% Si, 0.8-1.8% Mn, 0.5-1.8% Ni, ≤1.015% P, ≤1.003% S, 0.0002-0.008% B, optionally 0.01-0.3% Ti, optionally 0.01-0.05% Al, optionally 0.002-0.005% N. This composition makes it possible to manufacture a press hardened part with a tensile strength higher than 1000 MPa and with elongation higher than 10%. However, due to its high nickel content, this steel is costly to manufacture.

The document EP1881083 discloses a press hardened part made from a steel alloy containing 0.11-0.18% C, 0.10-0.30% Si, 1.60-2.20% Mn, <0.0015% P, <0.010% S, 1.00-2.00% Cr, <0.020% N, 0.020-0.060% Nb, 0.001-0.004% B, 0.001-0.050% Ti. The part has a tensile strength higher than 1200 MPa and a total elongation more than 12%. However, due to its high chromium content, this steel is costly to manufacture.

SUMMARY OF THE INVENTION

It is desired to have a press hardened part and a manufacturing process that would not have the previous limitations. It is more particularly desired to have a press hardened steel part with a thickness comprised between 0.8 and 4 mm and a yield stress YS comprised between 700 and 950 MPa, a tensile stress TS comprised between 950 and 1200 MPa, and a high ductility characterized by a bending angle higher to 75°.

It is also desired to have a press hardened part with a fracture strain under plane strain condition, higher than 0.60.

As heavily deformed areas in the press hardened parts, such as for example the radii zones, are subjected to high stress concentration during further service conditions or during vehicles collisions, it is also desirable to have press hardened parts which would display higher ductility in these deformed zones.

It is also desirable to have press hardened parts which would be easily weldable, and press hardened welded joints with high ductility and free from significant softening in the Heat Affected Zones.

It is also desirable to have steel sheets that would be suitable for Laser welding: this process is very sensitive to misalignment defects that can be due to insufficient flatness: thus, sheets with very good flatness properties are required for Laser welding.

It is also desirable to have a steel sheet that could be easily weldable either in a homogeneous process (i.e. welding of two sheets with the same composition) or in heterogeneous process (welding of two sheets with different steel compositions) and further press hardened, and that these press hardened welds have high mechanical properties.

It is also desired to have a steel composition for press hardening that could be available either in uncoated state or with a metallic coating providing to the steel substrate a corrosion resistance after press hardening.

The present invention provides a press hardened steel part with a steel chemical composition comprising, in weight: 0.062%≤C≤0.095%, 1.4%≤Mn≤1.9%, 0.2%≤Si≤0.5%, 0.020%≤Al≤0.070%, 0.02%≤Cr≤0.1%, wherein 1.5% ≤(C+Mn+Si+Cr)≤2.7%, 0.040%≤Nb≤3.4×N≤8×N, wherein: 0.044% ≤(Nb+Ti)≤0.090%, 0.0005≤B≤0.004%, 0.001%≤N≤0.009%, 0.0005%≤S≤0.003%, 0.001%≤P≤0.020% optionally: 0.0001%≤Ca≤1.003%, the remainder being Fe and unavoidable impurities, and wherein the microstructure comprises, in the majority of the part, in surface fractions: less than 40% of bainite, less than 5% of austenite, less than 5% of ferrite, the remainder being martensite, said martensite consisting of fresh martensite and of self-tempered martensite.

Preferably, the composition is such that: 1.7%≤(C+Mn+Si+Cr)≤2.3%.

In a preferred embodiment, the C content of the steel part is such that: 0.065%≤C≤0.095%

Preferably, the microstructure comprises at least 5% in surface fraction of self-tempered martensite.

The sum of fresh martensite and of self-tempered martensite surface fractions is preferably comprised between 65 and 100%.

According to a preferred embodiment, the average size of titanium nitrides is less than 2 micrometers in the outer zones comprised between one quarter thickness of the part, and the closest surface of the part.

Preferably, the average length of sulfides is less than 120 micrometers in the outer zones comprised between one quarter thickness of the part, and the closest surface of the part.

According to a preferred embodiment, the press hardened steel part comprises at least one hot deformed zone (A) with a deformation quantity higher than 0.15, and at least one zone (B) having experienced the same cooling cycle in press hardening than zone (A), wherein the deformation quantity is less than 0.05.

The difference in hardness between the zone (B) and the hot deformed zone (A) is preferably more than 20 HV.

Preferably, the average lath width of the martensitic-bainitic structure in the hot deformed zone (A) is reduced by more than 50% as compared to the lath width of the martensitic-bainitic structure in the zone (B).

In a preferred embodiment, the average lath width of the martensitic-bainitic structure in the hot deformed zone (A) is less than 1 µm.

The average lath width of the martensitic-bainitic structure in the zone (B) is preferably comprised between 1 and 2.5 µm.

According to one embodiment of the invention, the press hardened steel part is coated with a metallic coating.

The metallic coating is preferably zinc-based alloy or zinc alloy.

Preferably, the metallic coating is aluminum-based alloy or aluminum alloy.

In a preferred embodiment, the press hardened part has a yield stress comprised between 700 and 950 MPa, a tensile stress TS comprised between 950 and 1200 MPa, and a bending angle higher than 75°.

According to a preferred embodiment, the press hardened steel part has a variable thickness.

Very preferably, the variable thickness is produced by a continuous flexible rolling process.

The present invention also provides a press hardened laser welded steel part, wherein at least one first steel part of the weld is an Al coated part as described above, welded with at least at least one second steel part, the composition of which contains from 0.065 to 0.38% of carbon in weight, and wherein the weld metal between the first steel part and the second steel part has an aluminum content less than 0.3% in weight, and wherein the first steel part, the second steel part, and the weld metal, are press hardened in the same operation.

The present invention further provides a process for manufacturing a press hardened steel part comprising the following and successive steps:

providing a steel semi-product with the composition mentioned above, hot rolling the semi-product to obtain a hot rolled steel sheet, coiling the hot rolled steel sheet at a coiling temperature Tc comprised between 550° C. and Ms, Ms being the martensitic transformation start temperature of the steel sheet, so as to obtain a coiled steel sheet, optionally cold rolling the coiled steel sheet, annealing the steel sheet at an annealing temperature Ta in order to obtain less than 10% of unrecrystallized area fraction, so to obtain an annealed steel sheet, cutting the annealed steel sheet to a predetermined shape so to obtain a blank, heating the blank and holding it at a temperature Tm comprised between 890 and 950° C., the holding duration Dm at the temperature Tm being comprised between 1 and 10 minutes, so as to obtain a heated blank, transferring the heated blank within a forming press, the transfer duration Dt being less than 10 s, hot forming the heated blank in the forming press so as to obtain a formed part, cooling said formed part at a cooling rate CR1 comprised between 40 and 360° C./s in a temperature range between 750 and 450° C., and at an cooling rate CR2 between 15 to 150° C./s in a temperature range comprised 450° C. and 250° C., wherein CR2<CR1.

Preferably, the cold rolling ratio is comprised between 50 and 80%.

The annealing temperature Ta is preferably comprised between 800 and 850° C., and very preferably between 800 and 835° C.

In a particular embodiment, the blank is cold formed before heating said blank at said temperature Tm.

Preferably, the hot forming is performed with a deformation quantity higher than 0.15 in at least one hot deformed zone of the part, In a preferred embodiment, the annealed steel sheet is precoated with metallic precoating, before cutting the annealed steel blank to a predetermined shape.

The metallic precoating is preferably zinc, or zinc-based alloy, or zinc alloy.

Preferably, the metallic precoating is aluminum, or aluminum-based alloy, or aluminum alloy.

According to a preferred embodiment, the sheet is precoated with at least one intermetallic layer containing Al and iron, and optionally silicon, and the precoating contains neither free Al, nor $\tau_5$ phase of Fe3Si2Al12 type, nor $\tau_6$ phase of Fe2Si2Al9 type.

In another preferred embodiment, the metallic precoating comprises a layer of aluminum or an aluminum-based alloy or an aluminum alloy, topped by a layer of zinc or zinc-based alloy or a zinc alloy.

The invention even further provides a process for manufacturing a press hardened Laser welded steel part, comprising the successive following steps:

providing at least one first steel sheet with a composition as mentioned, precoated with a metallic precoating of aluminum, or aluminum-based alloy, or aluminum alloy, providing at least one second steel sheet with a composition containing, from 0.065 to 0.38% of carbon in weight, precoated with a metallic precoating of aluminum, or aluminum-based alloy, or aluminum alloy, removing a portion of the thickness of the aluminum precoating at the upper and lower sides along one side of the periphery of the first steel sheet and the second steel sheet, then creating a welded blank by Laser welding the first steel sheet and the second steel sheet, such that the aluminum content in the weld metal is lower than 0.3% in weight, the Laser welding being performed along the periphery wherein a portion of the aluminum precoating has been removed, heating the welded blank and holding it at a temperature Tm comprised between 890and 950° C., the holding duration Dm at said temperature being comprised between 1 and 10 minutes, so as to obtain a heated welded blank, transferring the heated welded blank within a forming press, the transfer duration Dt being less than 10 s, hot forming the heated welded blank in the forming press so as to obtain a welded formed part, cooling the welded formed part at a cooling rate CR1 comprised between 40 and 360° C./s in a temperature range between 750 and 450° C., and at an cooling rate CR2 between 15 to 150° C./s in a temperature range comprised 450° C. and 250° C., wherein CR2<CR1.

Preferably, the holding duration Dm is comprised between 1 and 6 minutes

The invention also provides use of a part as described above, or manufactured according to a process as described above, for the manufacturing of structural or safety parts of vehicles.

BRIEF DESCRIPTION OF THE DRAWINGS

The invention will now be described in more details but without limitations in view of the following figures, wherein.

DETAILED DESCRIPTION

Figure 1:
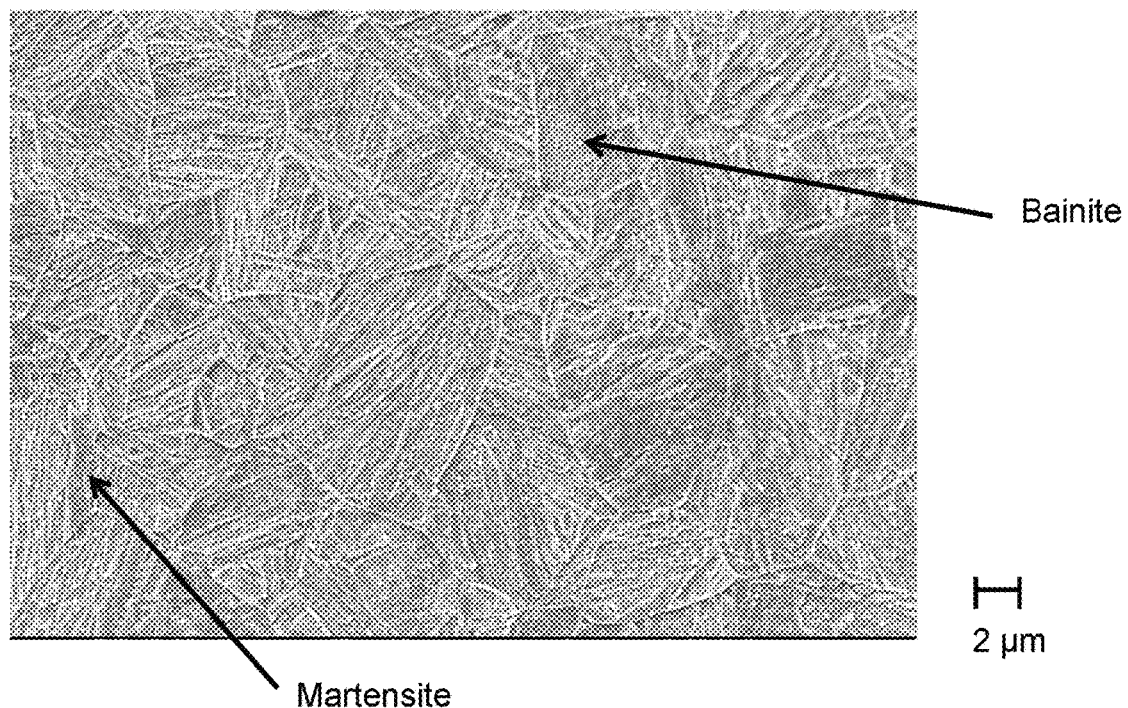
FIGS. 1 and 2 illustrate the microstructures of press hardened parts fabricated according the invention.

The press hardened steel parts are manufactured from a steel sheet having a specific composition, the elements being expressed in weight percentage:

$0.062\% \leq C \leq 0.095\%$: carbon content must be not less than 0.062% for obtaining sufficient quenchability and hardenability, and satisfactory tensile strength after press hardening. C content is optimally not less than 0.065% in order to obtain such properties in a stable manner. However, when the carbon content exceeds 0.095%, the bendability and the weld toughness are reduced.

$1.4\% \leq Mn \leq 1.9\%$: manganese must not be less than 1.4% Mn for having a sufficient hardenability, so as to obtain a structure with sufficient martensite proportion after press hardening. However, manganese content higher than 1.9% increases the risk of the formation of segregations with band-type microstructures associated with ductility decrease.

$0.2\% \leq Si \leq 0.5\%$: silicon contributes to steel deoxidation in the liquid stage and to hardening after hot forming. In order to obtain these effects, Si must be higher than 0.2%. However, Si must not exceed 0.5% so as to avoid an excessive stabilization of austenite during the cooling step in press hardening. Furthermore, such high Si content can cause the formation of surface oxides that prevent the adherence of the coating in the manufacturing of metallic coated steel sheets.

$0.020\% \leq Al \leq 0.070\%$: when added in quantity not less than 0.020%, aluminum is a very effective deoxidizer in the liquid state. However when Al exceeds 0.070%, there is a risk of formation of coarse aluminates in the liquid state, which could reduce the ductility of the press hardened part.

$0.02\% \leq Cr \leq 0.1\%$: in quantity higher than 0.02%, chromium addition is effective for increasing quenchability during press hardening. However, in combination with the other elements of the composition that also increase quenchability, a Cr addition higher than 0.1% favors the conditions of a fully martensitic structure even in the deformed zones, without the possibility of bainite formation that increase the ductility.

$0.030\% \leq Nb \leq 0.060\%$: in combination with carbon and/or nitrogen, niobium forms fine Nb(CN). Nb content not less than 0.030% makes it possible to obtain such precipitates which refine austenite grain size during the heating that precedes immediately the hot press forming. This finer austenite grain results in finer lath structure and increased ductility and toughness. However, content higher than 0.060% causes higher hardness of the hot-rolled sheet that makes more difficult to perform hot band rolling.

$3.4 \times N \leq Ti \leq 8 \times N$: titanium precipitates at high temperature under the form of nitrides. When Ti is not less than $3.4 \times N$, a sufficient quantity of nitrogen is stably bound with titanium, so that nitrogen is no more available to combine with boron. Thus, boron is available for diffusing towards austenite grain boundaries and to delay the transformation of austenite on cooling, thus increasing quenchability. However, when titanium exceeds $8 \times N$, there is a risk that titanium precipitates at the liquid stage during steel elaboration, thus creating coarse titanium nitrides that lower ductility and bendability after press hardening. Even more preferably, the Ti content is lower than $7 \times N$.

$0.044\% \leq (Nb+Ti) \leq 1.090\%$: the sum of the niobium and titanium contents must be not less than 0.044% so as to obtain a precipitation that contributes to obtain a tensile strength higher than 950 MPa after press hardening. However, the sum of titanium and niobium must not exceed 0.090%, unless increasing the risk of obtaining a bending angle less than 75° after press hardening.

$0.0002\% \leq B \leq 0.004\%$: at a content of at least 0.0002%, boron prevents the formation of ferrite on cooling and increases quenchability during the press hardening process. Its content is limited to 0.004% because above this level, its effect is saturated and further addition is not effective.

$0.001\% \leq N \leq 0.009\%$: the nitrogen content is adjusted during steel elaboration. In a content not less than 0.001%, nitrogen combines with titanium and niobium to form nitrides and carbonitrides which limit the coarsening of austenite grain during heating which in turn refine the martensitic laths and the bainitic structure obtained after press hardening. However, a N content higher than 0.009% lowers the bending angle of the press hardened part and reduces ductility. Even more preferably, the nitrogen content is lower than 0.007%.

$0.0005\% \leq S \leq 0.003\%$: sulfur content must not be higher than 0.003% since sulfides are created which lower bendability and ductility of the press hardened part. However, S content lower than 0.0005% needs costly desulfurization treatment, without significant benefit. Thus, S content not less than 0.0005% is preferred.

0.001%≤P≤0.020%: when present in quantity higher than 0.020%, phosphorus can segregate at the austenite grain boundaries and reduce toughness of the press hardened part. However, P content lower than 0.001% needs costly treatment at the liquid stage, without significant benefit on the mechanical properties of the press hardened part. Thus, P content not less than 0.001% is preferred.

0.0001%≤Ca≤0.003%: as an optional element, calcium can be added to the steel composition. When added in a content not less than 0.0001%, Ca combines with sulfur and oxygen, thus creating oxysulfides that do not exert a detrimental effect on ductility, as in the case of elongated manganese sulfides. Furthermore, these oxysulfides act as nucleants for a fine precipitation of (Ti, Nb)(C,N) This effect is saturated when Ca content is higher than 1.5%≤(C+Mn+Si+Cr)≤2.7%: carbon, manganese, silicon, chromium are elements increasing quenchability. The sum of the contents of these elements is selected in combination so as to obtain the desired result: when (C+Mn+Si+Cr) is less than 1.5% in weight, there is a risk that the quenchability is insufficient for obtaining the desired surface fraction of martensite. However, when the sum of the contents of these elements is higher than 2.7%, there is a risk to form a high quantity of fresh martensite that can reduce the toughness of the press hardened part. Preferably, in order to ensure very efficient and stable results regarding quenchability and toughness, the contents are such that: 1.7%≤(C+Mn+Si+Cr)≤2.3%:

The microstructure of the press hardened steel part according to the invention will be now described. This microstructure description applies to the majority of the press hardened steel part, which means that this microstructure is present in at least 95% of the volume of the press hardened part in order to achieve the desired mechanical properties. As will be explained below, due to the fact that the part can be welded before press hardening, i.e. that the weld microstructure may be different from the bulk of the press hardened part, or due to the microstructural changes that may result from more intense local deformation in the press forming step, the microstructure may be locally different in some zones of the part, which account for less than 5% of the volume of this part.

Thus, the majority of the hardened part contains more than 50% of martensite in surface fraction. The surface fraction is determined through the following method: a specimen is cut from the press hardened part, polished and etched with a reagent known per se, so as to reveal the microstructure. The section is afterwards examined through optical or scanning electron microscope. The determination of the surface fraction of each constituent (martensite, bainite, ferrite, austenite) is performed with image analysis through a method known per se.

Martensite is present as fine elongated laths, oriented within the prior austenite grains.

According to the cooling rate in the press hardening process and to the transformation temperature Ms of austenite into martensite, martensite may be present as fresh martensite and/or as self-tempered martensite. The specific features of these sub-constituents can be determined through electron microscope observations:

self-tempered martensite appears as fine laths containing iron carbides, the carbides being oriented according to the directions <111> of the laths lattice. It is obtained by carbides precipitation in a temperature range lower than Ms, when the cooling rate after hot forming is not too high so to make it possible this precipitation.

by contrast, fresh martensite, in the form of laths or films, does not include such carbides precipitates.

According to a preferred embodiment of the invention, the sum of fresh martensite and of self-tempered martensite surface fractions in the press hardened part is comprised between 65 and 100%. Such condition contributes to achieve a tensile strength of at least 950 MPa, when the cooling rate in press hardening is comprised between 40 and 360° C./s in a temperature range between 750 and 450° C.

According to another preferred embodiment, the microstructure of the press hardened parts contains, in surface fraction, at least 5% of self-tempered martensite. Thus, increased ductility and bendability is obtained, as compared to the situation wherein the microstructure contains only fresh martensite.

The microstructure of the parts may include also bainite, in a surface fraction lower than 40%, in order to increase the toughness and the bendability of the press hardened part. In comparison with the situation wherein only martensite is present in the structure, bainite makes it possible to obtain higher ductility.

The microstructure of the parts may also include ferrite. However, this soft and ductile constituent does not make it possible to achieve high tensile stress. Thus, as one object of the invention is to manufacture press hardened part with a tensile strength comprised between 950 and 1200 MPa, the surface fraction of ferrite must not be higher than 5%, otherwise the desired strength could not be obtained.

The microstructure of the parts may also include a small proportion of austenite. which is, at room temperature, retained austenite. When carbon and silicon contents are high, the transformation temperature of austenite on cooling may be lowered to such an extent that austenite is stabilized at room temperature. Austenite may be present under the form of martensite-austenite (or "M-A") islands, associating these two types of constituents. When present in surface fraction less than 5%, austenite contributes to increase ductility. However, when the austenite fraction is higher, there is a risk that this austenite has not a high stability and cannot be easily transformed in fresh martensite in the case of collision or of temperature decrease, thus causing a toughness decrease.

Figure 7:
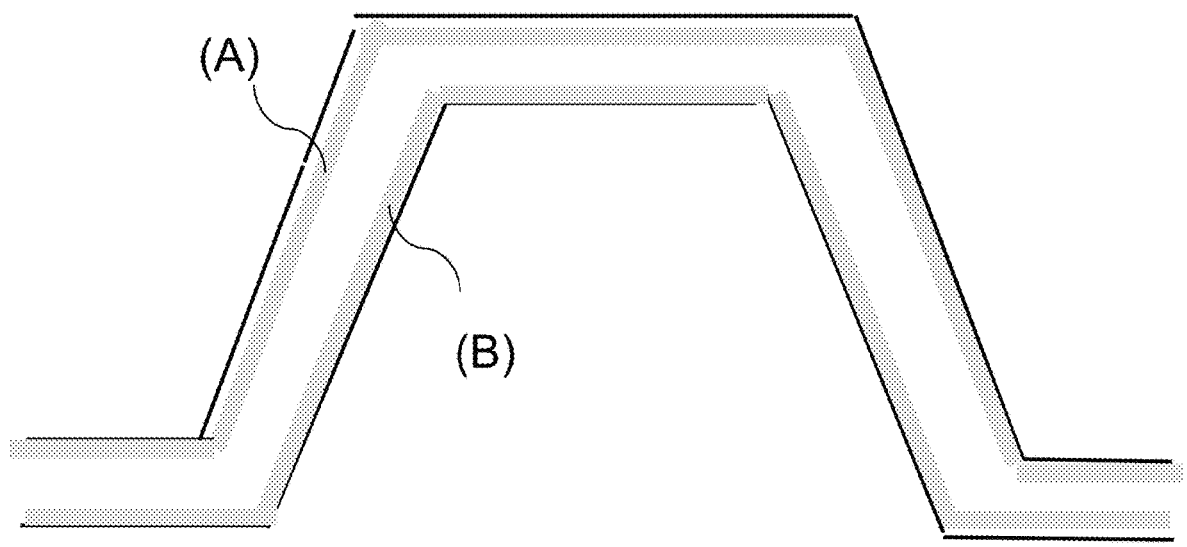
FIG. 7 illustrates schematically the outer zones near the surface of a press hardened part.

As the press hardened part must have high bendability properties, it has been found that the average size of titanium nitrides must be controlled to this end. The average size of TiN may be determined through observations by Scanning or Transmission Electron Microscopy observations. More specifically, it has been determined that the average size of TiN must be limited in the outer zones near the surface of the press hardened part, which are the most strained zones during bending. These zones are comprised between one quarter thickness of the part, and the closest surface of the part. Such outer zones, parallel to the main surfaces of the press hardened parts, are illustrated as an example on a schematic drawing of a press hardened Hat-shaped part (or "omega" shaped) on FIG. 7, wherein they are referred to as (A) and (B). It will be understood that such illustration of the outer zones is not limited to this specific hat-shaped geometry, but applies to any press hardened part geometry.

If the average size of TiN is not less than 2 micrometers, damage is initiated at the boundaries between the rectangular-shaped titanium nitrides and the matrix, and the bending angle may be less than 75°.

In these outer zones, there is also a risk that damage initiation results from the presence of elongated sulfides: these constituents can be present when sulfur content is sufficiently high to combine, mainly with manganese, under the form of coarse precipitates. As their plasticity is high at elevated temperatures, they are easily elongated by hot rolling and during hot deformation in press hardening. Thus, when the average length of sulfides is higher than 120 micrometers in the outer zones (i.e. from one quarter thickness to the closest surface), the fracture strain can be less than 0.60 due to ductile initiation on these sulfides.

This press hardened part described above may be uncoated or optionally coated. The coating may be aluminum-based alloy or aluminum alloy. The coating may be also zinc-based alloy or zinc alloy.

In a particular embodiment, the press hardened steel part of the invention can have a thickness which is not uniform but which can vary. Thus, it is possible to achieve the desired mechanical resistance level in the zones which are the most subjected to external stresses, and to save weight in the other zones of the press hardened part, thus contributing to the vehicle weight reduction. In particular, the parts with non-uniform thickness can be produced by continuous flexible rolling, i.e. by a process wherein the sheet thickness obtained after rolling is variable in the rolling direction, in relationship with the load which has been applied through the rollers to the sheet during the rolling process. Thus, within the conditions of the invention, it is possible to manufacture advantageously vehicle parts with varying thickness such as front and rear rails, seat cross members, tunnel arches, pillars, dash panel cross members, or door rings.

The process for manufacturing the press hardened part will be now explained.

A semi-product in the form of cast slab or ingot, able to be further hot-rolled, is provided with the steel composition described above. The thickness of this semi-product is typically comprised between 50 and 250 mm.

This semi-product is hot-rolled so to obtain a hot-rolled steel sheet and coiled at a temperature Tc. The coiling temperature must not be higher than 550° C., otherwise a too important precipitation of niobium carbonitrides occurs, which induces hardening and increases difficulties for the further cold rolling step. When Tc does not exceed 550° C., at least 50% of free niobium remains in the steel sheet. Tc must also not be lower than Ms so to avoid martensite formation which makes the cold rolling step more difficult.

At this stage, the thickness of the hot rolled steel sheet may be in the typical range of 1.5-4 mm. For applications wherein the desired final thickness in the range of 2.5-4 mm, the steel sheets may be directly annealed with the process described below. For applications in the range of 0.8-2.5 mm, the hot-rolled sheets are pickled in usual conditions and further cold rolled. The cold rolling ratio is defined in the following manner: if $t_0$ designates the thickness before cold rolling, and $t_f$ the thickness after cold rolling, the rolling ratio is: $(t_i-t_f)/t_i$. In order to obtain a high fraction of recrystallization during the ulterior annealing, the cold rolling ratio is typically comprised between 50 and 80%.

Then, the hot rolled, or hot rolled and further cold rolled sheet, is annealed in the intercritical range Ac1-Ac3, at a temperature Ta selected so to obtain less than 10% of unrecrystallized fraction. When the unrecrystalllized fraction is less than 10%, it has been put into evidence that the flatness of the steel sheet after annealing was especially good, which makes it possible to produce sheets or blanks that can be used in Laser welding. Laser welding requests blanks with strict flatness tolerances, otherwise geometrical defects can occur in welding due to gaps. An annealing temperature Ta comprised between 800 and 850° C. makes it possible to obtain this result. An annealing temperature in the preferred range of 800-835° C. makes it possible to achieve very stable results.

After the holding step at the temperature Ta, the immediate further steps of the process depend upon the type of sheet which is to be manufactured:
 if an uncoated sheet is to be produced, the annealed steel sheet is cooled down to room temperature.
 alternatively, a steel sheet with a metallic precoating can be produced:
  if the desired precoating is aluminium, aluminium-based alloy (i.e. that Al is the main element in weight percentage of the precoating) or aluminium alloy (i.e. that Al is higher than 50% in weight in the precoating), the steel sheet is hot-dipped in a bath at a temperature of about 670-680° C., the exact temperature depending on the composition of the aluminium based alloy or the aluminium alloy. A preferred pre-coating is Al—Si which is obtained by hot-dipping the sheet in a bath comprising, by weight, from 5% to 11% of Si, from 2% to 4% of Fe, optionally from 0.0015 to 0.0030% of Ca, the remainder being Al and impurities resulting from the smelting.
  The sheet is thereafter cooled to room temperature. As an option, this Al, Al-based, or Al alloy sheet can be submitted to a further heat treatment, at a temperature in the range of 620-680° C., so to obtain a prealloying of the precoating in the steel substrate. This pretreatment will make possible to heat more rapidly the steel blank in the further press hardening process. After this prealloying treatment, the precoating contains at least one intermetallic layer containing Al and iron, and optionally silicon, and contains neither free Al, nor $\tau_5$ phase of $Fe_3Si_2Al_{12}$ type, nor $\tau_6$ phase of $Fe_2Si_2Al_9$ type.
  if the desired precoating is zinc, zinc-based alloy, or zinc alloy, the steel sheet is hot-dipped in a bath at a temperature of about 460° C., the exact temperature depending on the composition of the zinc based alloy or the zinc alloy. The precoating may be continuous hot-dip galvanizing or galvannealing, i.e. including a heat treatment immediately after hot-dip galvanizing at about 450-520° C. so to obtain a precoating containing 7-11% Fe.
  as an option, the metallic precoating process can include the deposition of two layers, i.e. the metallic precoating is composed of a layer of aluminum or an aluminum-based alloy or an aluminum alloy, topped by a layer of zinc or zinc-based alloy or a zinc alloy.

The annealed steel sheet, either uncoated or precoated, is then cut to a predetermined shape so to obtain a flat blank that is able to be hot formed in a further step.

As an option, before the heating and hot forming steps in press, the blank can be cold formed so to obtain a predeformed blank. This cold predeformation makes it possible to reduce the amount of deformation in the next hot forming step.

Then, the blank, either flat or cold predeformed, is heated at a temperature Tm comprised between 890 and 950° C. The heating means are not limited and can be radiation, induction, or resistance-based. The heated blank is held at Tm for a duration Dm comprised between 1 and 10 minutes. These (temperature-duration) ranges make it possible to obtain the full transformation of the steel into austenite. If the blank is precoated, this treatment causes the interdiffusion of the precoating with the steel substrate. Thus, during the heating, intermetallic phases are temporarily or definitively created by interdiffusion, which make it possible to facilitate further deformation in the hot press and to prevent decarburization and oxidation of the steel surface. For increased process efficiency, the duration Dm is comprised between 1 and 6 minutes.

After the heating and holding steps, the heated blank is extracted from the heating device, which can be for example a heating furnace. The heated blank is transferred into a forming press, the transfer duration Dt being less than 10 s. This transfer must be fast enough so to avoid the formation of polygonal ferrite before the hot deformation in the press, otherwise there is a risk that the tensile strength of the press hardened part becomes less than 950 MPa.

The heated blank is thereafter hot formed in a forming press, so to obtain a formed part. During the forming step, the modes and quantities of deformation differ from one place to another because of the geometry of the final part and of the forming tools. For example, some zones may be in expansion, while other are deformed in restraint. Whatever the deformation mode, an equivalent deformation $\varepsilon_b$ can be defined at each location in the press hardened part, as $$\varepsilon_b = \frac{2}{\sqrt{3}}\sqrt{\varepsilon_1^2 + \varepsilon_1\varepsilon_2 + \varepsilon_2^2},$$

wherein $\varepsilon_1$ and $\varepsilon_2$ are the principal deformations. Thus, $\varepsilon_b$ expresses the amount of strain introduced by the hot forming process in each zone of the press hardened part.

The part is then kept within the tooling of the forming press so as to ensure a proper cooling rate and to avoid part distortion due to shrinkage and phase transformations.

The part mainly cools by conduction through heat transfer with the tools. The tools may include coolant circulation so as to increase the cooling rate, or heating cartridges so as to lower cooling rates. Thus, the cooling rates can be adjusted through the implementation of such means.

For obtaining a press hardened part according to the invention, the formed part is first cooled in a temperature range between 750 and 450° C., at a cooling rate CR1 comprised between and 360° C./s. Within this range, a transformation of austenite into martensite, eventually of bainite, occurs.

In a further step, the part is cooled in a temperature range comprised 450° C. and 250° C., at a cooling rate CR2 between 15 to 150° C./s, slower than the cooling rate CR1, i.e. than CR2<CR1. Within this range, the self-tempering of the martensite may occur at a certain degree, i.e. fine carbides precipitate. Toughness is increased through this self-tempering step.

Parts obtained through the described method have a thickness which is typically comprised between 0.8 and 4 mm.

The inventors have found a method to obtain high ductility in the zones of the press hardened part wherein high stress concentration is experienced during the use of the part: when the zones in the forming press are deformed with an equivalent strain $\varepsilon_b$ higher than 0.15, the inventors have shown that the structure of these deformed zones is finer and that softer and more ductile phases, can be obtained in these regions.

The inventors have compared not deformed or little deformed zones (the later designating zones wherein $\varepsilon_b$<0.05) with zones wherein strain has been applied with an amount higher than The hardness of the highly strained zones, decreases of more than 20 HV1 (HV1 being the Vickers Hardness measured under 1 kgf load) as compared to unstrained or little strained zones in the press hardened part. This local softening corresponds to a toughness increase. However, the amount of the softening remains limited which means that the yield stress and tensile strength requirements are fulfilled in these deformed zones.

The average martensitic (fresh or self-tempered)/bainitic lath size $L_s$ has been measured in little or highly deformed zones. After proper etching to reveal the microstructure, the lath size is determined by the intercept method which is known per se. In the zones wherein the applied strain is higher than 0.15, the average bainitic/martensitic lath size width is less than 1 µm. By comparison, the average lath size $L_s$ in little deformed zones is in the range of 1-2.5 µm. It has been also put into evidence that the application of strain level higher than 0.15 reduces the lath size of more than 50%, as compared to little deformed zones. This reduction of the lath size increases the resistance to eventual crack initiation and propagation.

Thus, the combination of the steel composition and of the press hardening parameters, makes it possible to achieve high-ductility in targeted zones of the parts. In automobile applications, the formed parts display higher ductility in case of collisions.

Another object of the invention is a press hardened welded steel part with aluminum coating, which takes advantage of the high mechanical properties of the press hardened part: for manufacturing such part, at least one first steel sheet with the composition above, coated with Al, or Al-based alloy, or Al alloy, is provided. Together with this first sheet, at least a second steel sheet, also precoated with Al, or Al-based alloy, or Al alloy, is provided. The sheets may have the same compositions or different compositions, and the same thickness or different thicknesses. In the case of different compositions, it has been put into evidence that the carbon content of the second steel has to be comprised between 0.065 and 0.38% in weight, so to create a weld having the desired ductility properties.

The first and second sheets are welded along one of their respective peripheral sides. On these peripheral sides, a part of the thickness of the Al precoating is removed. This removal can be performed through pulsed Laser ablation, or through mechanical ablation. The aim of this ablation is to avoid that a too high quantity of Al of the precoating is molten and incorporated in the weld metal. According to the initial Al precoating thickness, and to the sheet thicknesses, the quantity of Al to be removed by ablation may be more of less high. The inventors have shown that the ablation conditions must be adapted so that the Al content in the weld metal created between the first and the second sheet, is less than 0.3% in weight. Otherwise, either brittle intermetallics may precipitate in the weld, or the high Al content could prevent the transformation into austenite when heating before press forming, due to the alphagene character of aluminum.

Thus, when these conditions are fulfilled, the first and second sheets may be press hardened in the conditions described above, without the risk of cracks during hot forming. The press hardened welded part thus obtained, wherein the weld metal and the first and second sheet have been press hardened in the same operation, displays high mechanical resistance and ductility properties.

The invention will be now illustrated by the following examples, which are by no way limitative.

Example 1

Steels with compositions according to table 1, expressed in weight percentage, have been provided under the form of slabs. These slabs have been heated at 1250° C., hot-rolled and coiled at 520° C. After pickling, the hot-rolled sheets have been cold rolled down to a thickness of 1.5 mm, with a rolling ratio of 50%. The sheets were thereafter annealed at 830° C., so to obtain an unrecrystallized surface fraction less than 10%, and precoated with Al—Si by continuous hot-dipping in a bath at 675° C. The precoating thickness is 25 μm on both sides. These precoated sheets have been cut into blanks which have been further press hardened.

TABLE 1

Steel compositions (weight %)

| | C | Mn | Si | Al | Cr | Nb | Ti | B | N | S | P | Nb + Ti | C + Mn + Cr + Si | Others |
|---|---|---|---|---|---|---|---|---|---|---|---|---|---|---|
| I1 | 0.090 | 1.5 | 0.26 | 0.034 | 0.05 | 0.048 | 0.021 | 0.002 | 0.0045 | 0.0016 | 0.006 | 0.069 | 1.90 | |
| I2 | 0.091 | 1.67 | 0.265 | 0.040 | 0.03 | 0.036 | 0.019 | 0.003 | 0.004 | 0.002 | 0.008 | 0.055 | 2.056 | |
| I3 | 0.08 | 1.54 | 0.29 | 0.040 | 0.04 | 0.038 | 0.022 | 0.0021 | 0.005 | 0.002 | 0.010 | 0.060 | 1.95 | |
| I4 | 0.064 | 1.61 | 0.44 | 0.030 | 0.07 | 0.052 | 0.021 | 0.0032 | 0.0043 | 0.001 | 0.007 | 0.073 | 2.184 | |
| R1 | <u>0.22</u> | <u>1.16</u> | 0.26 | 0.030 | <u>0.17</u> | — | 0.035 | 0.003 | 0.005 | 0.001 | 0.012 | <u>0.035</u> | 1.81 | |
| R2 | 0.12 | 1.78 | 0.261 | 0.040 | <u>0.75</u> | <u>0.075</u> | 0.023 | 0.0035 | 0.005 | 0.003 | 0.008 | <u>0.098</u> | <u>2.911</u> | Mo: 0.2 |
| R3 | <u>0.060</u> | 1.6 | 0.20 | 0.040 | — | 0.048 | <u>0.07</u> | — | 0.005 | 0.002 | 0.015 | <u>0.118</u> | 1.86 | |
| R4 | 0.093 | 1.7 | 0.245 | 0.040 | 0.05 | — | 0.022 | 0.0035 | 0.005 | <u>0.004</u> | 0.012 | <u>0.022</u> | 2.088 | |

Underlined values: not corresponding to the invention.

Table 2 details the press hardening conditions, i.e. the heating temperature Tm, the heating duration Dm, the transfer duration Dt, and the cooling rates CR1 and CR2, which have been applied.

TABLE 2

Press hardening conditions

| Condition | Tm (° C.) | Dm (min.) | Dt (s) | CR1 (° C./s) | CR2 (° C./s) |
|---|---|---|---|---|---|
| A | 900 | 4 | 6 | 291 | 89 |
| B | 905 | 4 | 8 | 50 | 22 |
| C | <u>870</u> | 5 | 5 | 45 | 18 |
| D | 900 | 4 | 5 | <u>450</u> | <u>250</u> |
| E | 940 | 10 | 6 | <u>185</u> | <u>45</u> |

Underlined values: not corresponding to the invention.

Yield stress YS and tensile strength TS have been determined on the press hardened parts, using 20×80 mm² specimens according to Standard ISO (EN 10002-1)

Critical bending angle has been determined on press hardened parts of 60×60 mm² supported by two rollers, according to VDA-238 bending Standard. The bending effort is exerted by a 0.4 mm radius sharp punch. The spacing between the rollers and the punch is equal to the thickness of the tested parts, a clearance of 0.5 mm being added. The crack apparition is detected since it coincides with a load decrease in the load-displacement curve. Tests are interrupted when the load decreases more than 30 N of its maximal value. The bending angle (α) of each sample is measured after unloading and thus after specimen springback. Five samples along each direction (rolling direction and transverse direction) are bent so to obtain an average value as of the bending angle The fracture strain is determined through bending specimens in plane strain conditions, which is the most severe condition in view of vehicle collision. From these tests, it is possible to determine the critical displacement of the specimens when fracture occurs. On the other hand, Finite Element Analysis allows modeling the bending of such specimen, i.e. to know the strain level which is present in the bent zone for such critical displacement. This strain in such critical conditions is the fracture strain of the material.

The results of such mechanical tests are presented in Table 3. By convention, the test conditions associate the steel composition and the press hardening compositions. Thus, I1B refers for example to the steel composition I1 tested with the condition B.

The table 3 presents also some microstructural features of the press hardened parts. The surface fractions of the different constituents have been determined by polishing and etching the specimens with different reagents (Nital, Picral, Bechet-Beaujard, sodium metabisulfite and LePera) so to reveal the specific constituents. Quantification of the surface fractions have been performed through image analysis and Aphelion™ software, on more than ten representative zones of at least 100×100 μm².

The determination of TiN and sulfides has been performed by using optical micrography, Scanning Electron Microscopy associated to X-microanalysis. These observations have been performed in the zones located near the surfaces of the specimens, wherein the strain is the most important in bending mode. These sub-surface zones are located between one quarter thickness, and the closest surface of the parts. In each case, it was determined if the average size of TiN exceeded 2 μm, and if the average size of the sulfides exceeded 120 μm.

TABLE 3 mechanical properties and microstructural features of the press hardened parts

| Test | YS (MPa) | TS (MPa) | Critical bending angle $\alpha_A$ (°) | Fracture strain | Martensite (%) | Self-tempered Martensite (%) | Bainite (%) | Austenite (%) | Ferrite (%) | TiN size < 2 μm | MnS size < 120 μm |
|---|---|---|---|---|---|---|---|---|---|---|---|
| I1B | 814 | 1020 | 101 | 0.85 | 80 | 30 | 18 | 1 | 1 | Yes | Yes |
| I2A | 874 | 1137 | 84 | 0.65 | 96 | 10 | 3 | 1 | 0 | Yes | Yes |
| I3A | 940 | 1121 | 84 | 0.64 | 94 | 10 | 5 | 1 | 0 | Yes | Yes |
| I4E | 824 | 1056 | 91 | 0.74 | 89 | 20 | 10 | 1 | 0 | Yes | Yes |
| R1A | <u>1162</u> | <u>1504</u> | <u>61</u> | <u>0.37</u> | 100 | <u>3</u> | 0 | 0 | 0 | Yes | Yes |
| <u>I2C</u> | <u>666</u> | <u>1024</u> | 117 | 0.9 | <u>40</u> | 25 | 30 | 2 | <u>28</u> | Yes | Yes |
| <u>R2D</u> | <u>1191</u> | <u>1413</u> | 82 | 0.59 | 99 | <u>2</u> | 0 | 1 | 0 | Yes | Yes |
| <u>R3B</u> | <u>421</u> | <u>616</u> | 138 | <u>1.2</u> | <u><10</u> | <u><10</u> | <10 | <2 | <u>>75</u> | No | Yes |
| <u>R4A</u> | 909 | <u>1166</u> | <u>73</u> | <u>0.57</u> | 95 | 25 | <5 | <2 | 0 | Yes | <u>No</u> |

Underlined values: not corresponding to the invention.

Figure 2:
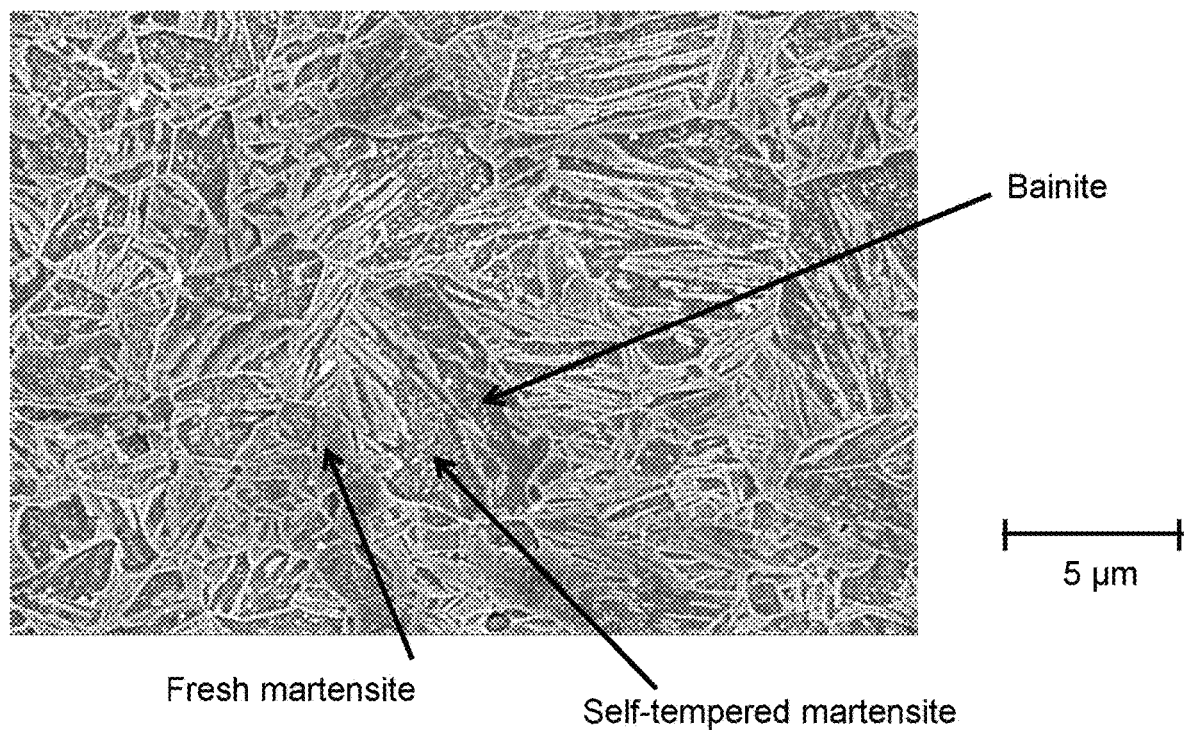

In the trials I1B, I2A, I3A, I4E, compositions and press hardening conditions correspond to the invention and the desired microstructural features are obtained. As a consequence, high tensile properties, high ductility and impact resistance are achieved. The microstructure of the parts I1B and I2A, as observed by Scanning Electron Microscope, is illustrated respectively on the FIGS. 1 and 2. Some details concerning the constituents have been highlighted on the micrographs.

In the trial R1A, the C, Mn, Cr, Nb contents do not fulfill the conditions of invention. Even if the press hardening conditions are in accordance with the ranges of the invention, the quantity of self-tempered martensite is insufficient and the bending angle and fracture strain do not meet the requested values.

In the trial I2C, even if the composition corresponds to the element ranges of the invention, the heating temperature Tm is insufficient. As a consequence, the ferrite surface fraction is too high and the martensite surface fraction is too low. Thus, the yield stress of 700 MPa cannot be reached.

In the trial R2D, due to the high cooling rates CR1 and CR2, the amount of self-tempered martensite is insufficient.

Figure 3:
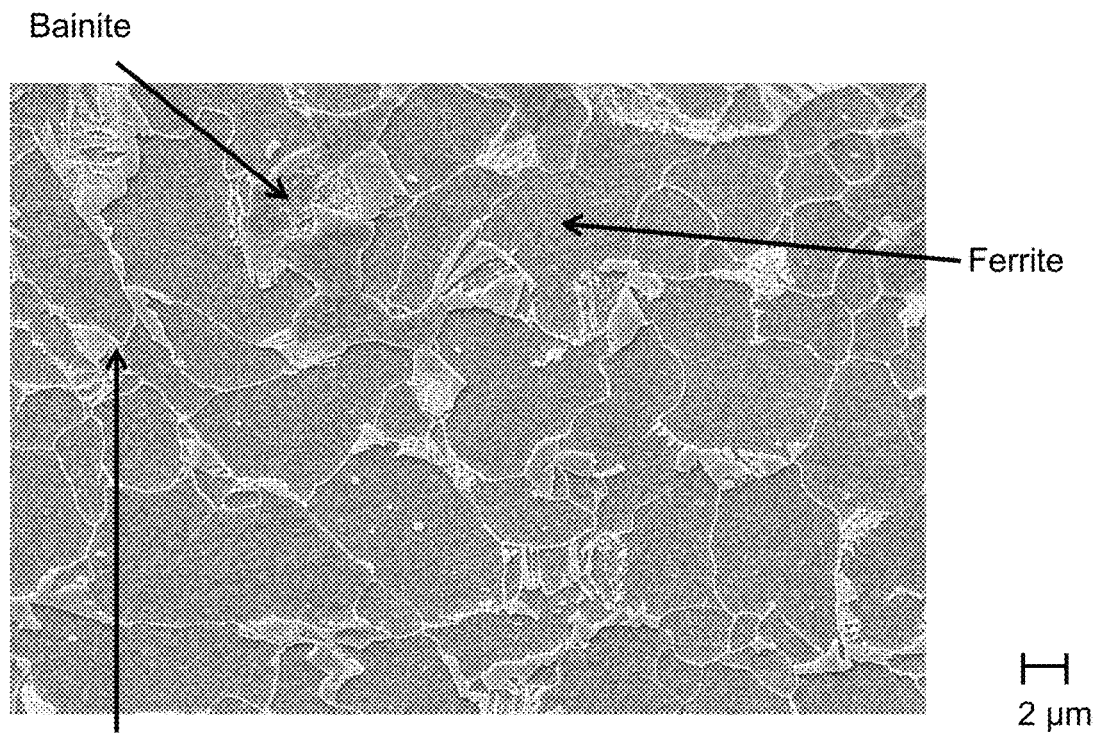
FIGS. 3 and 4 illustrate the microstructures of press hardened parts fabricated from steel compositions that do not correspond to the invention.
Figure 5:
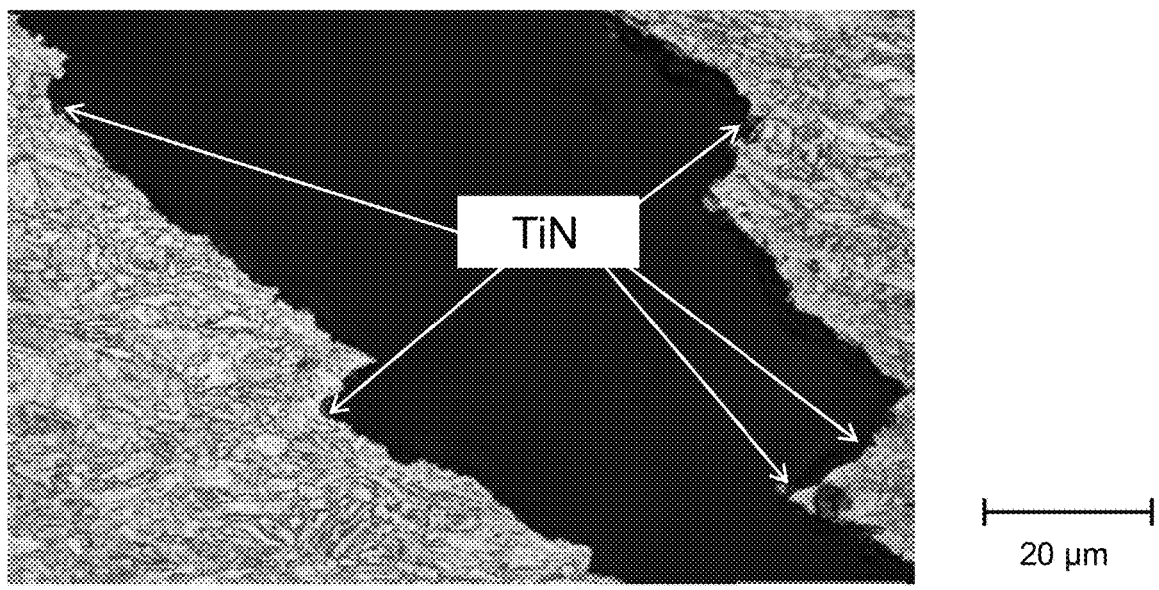
FIG. 5 illustrates the influence of large-sized titanium nitrides on the crack propagation path, in a press hardened part fabricated from a steel composition that does not correspond to the invention.

In the trial R3B, the C, Cr and B contents are too low. Thus, as the hardenability is insufficient, the ferrite content is too high and yield stress and tensile stress cannot be reached. The microstructure of R3B is illustrated on FIG. 3. For a given treatment (B), the influence of the steel composition can be seen through the comparison of microstructures of parts I1B (according to the invention) and R3B (not according to the invention) Furthermore, the high Ti content causes the formation of TiN with an average size higher than 2 μm. In fracture tests, some cleavage areas have been observed. FIG. 5 illustrates that these brittle areas correspond to the presence of TiN (pointed out in FIG. 5 by arrows) which act as initiation sites for cleavage. These coarse TiN are located near the surface of the press hardened part, i.e. in the outer zones comprised between one quarter thickness and the closest surface of the part. As a consequence, the fracture strain is insufficient.

Figure 4:
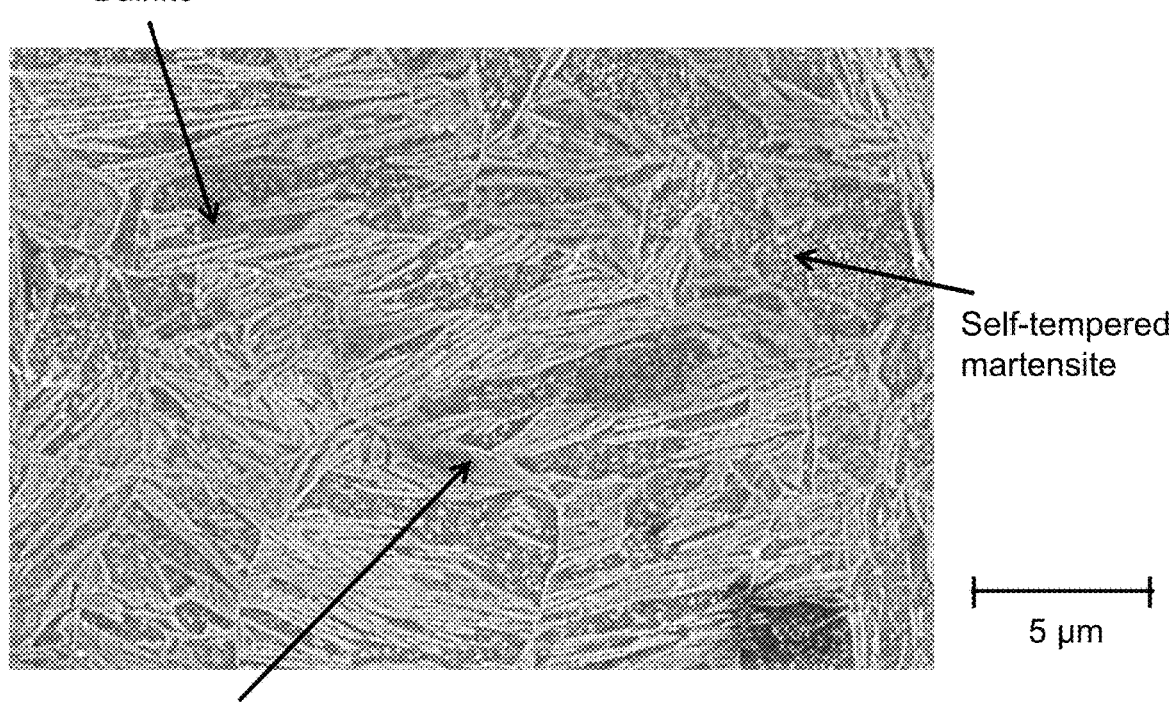
Figure 6:
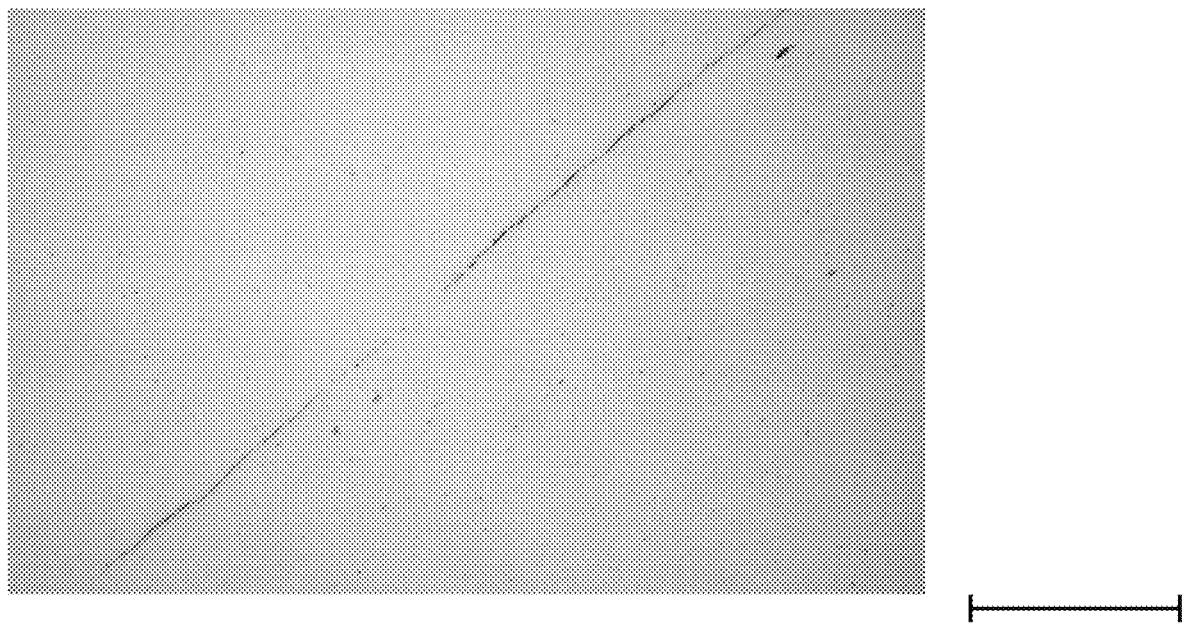
FIG. 6 illustrates large-sized manganese sulfide in a press hardened part, fabricated from a steel composition that does not correspond to the invention.

In the trial R4A, the Nb and the S contents do not fulfill the conditions of the invention. The microstructure of the part R4A is illustrated on the FIG. 4. Compositions of steels I4A and R4A are very similar, except for Nb and S contents. From the comparison of FIGS. 1 and 4, it may be seen that the prior austenitic grain size is larger in the absence of Nb, which in turns causes the formation of martensite laths with increased length, which offer less resistance to crack propagation. Furthermore, R4A has higher sulfur content, thus causing the formation of elongated MnS as illustrated on FIG. 6. These elongated sulfides are located near the outer zones comprised between one quarter thickness and the closest surface of the part. As a consequence, the critical bending angle and the fracture strain are too low.

Example 2

Resistance spot welding tests have been performed on the press hardened parts produced in the conditions I2A and R1A above. The welding parameters are: intensity: 7.2 kA, welding force: 450 daN. Hardness tests have been performed on cut and polished spot welds in order to determine an eventual softening in the Heat Affected Zones near the weld metal. The thermal cycle associated to the welding induces a temperature gradient ranging from room temperature up to steel liquidus. Heating at temperature in the range of Ac1-Ac3 may cause a softening of the microstructure of the press hardened part. This softening is measured by the difference between the base metal hardness and the minimum hardness value in the Heat Affected Zone. When softening is too important, an external applied stress can be concentrated in the softened zone, thus causing a premature failure by strain concentration. Tensile tests have been performed on resistance spot welds, and the total elongation of the welds has been measured. As compared to the base metal elongation, the welds cause an elongation variation which may be more or less pronounced as compared to the one of the base metal. Thus, the relative elongation variation is defined by: (base metal elongation-weld elongation)/base metal elongation. Results are presented in the table 4.

TABLE 4

Hardness variation in the Heat Affected Zones of resistance spot welds and its influence on total elongation

| Test condition | HAZ softening (Vickers Hardness HV1) | Relative softening (HV base metal − HV HAZ)/HV base metal (%) | Relative elongation variation (%) |
|---|---|---|---|
| I2A | 90 | 25% | 0% |
| R1A | 200 | 40% | 65% |

The amount of HAZ softening is less pronounced in the press hardened part I2A, manufactured according to the invention, than in the reference part R1A. Even in spite of the presence of this softened zone, no elongation loss is measured for the condition of invention I2A, while the elongation loss is significant for reference part R1A.

Example 3

Precoated Al—Si steel sheets with the compositions I2 and R1 were provided. As explained above, the fabrication process makes it possible to produce blanks with strict flatness tolerances which allow Laser welding.

Furthermore, a steel sheet, 1.5 mm thick, precoated with 25 μm thick Al—Si, having the composition of table 5, was also provided.

TABLE 5

Composition of steel R5 (weight %)

| | C | Mn | Si | Al | Cr | Nb | Ti | V | Mo | Ni | B | N | S | P |
|---|---|---|---|---|---|---|---|---|---|---|---|---|---|---|
| R5 | 0.34 | 0.63 | 0.56 | 0.04 | 0.36 | 0.04 | 0.03 | 0.03 | 0.19 | 0.4 | 0.003 | 0.005 | 0.002 | 0.004 |

When press hardened in condition A, this steel makes it possible to obtain tensile strength UTS of about 2000 MPa.

All these Al—Si precoated steel blanks were ablated on one of their peripheral sides. The metallic portion of the Al—Si coating was removed, while the intermetallic layer between the steel substrate and the precoating was left in place. This ablation was performed through a YAG Laser, 4 kW, with a focus spot of 1 mm$^2$, on the upper and lower sides on the precoated sheets.

Afterwards, Laser welding was performed with a 4 kW YAG Laser, with a welding speed of 6 m/Mn, under Helium protection. Different configurations were tested:
- homogeneous welding: I2 steel sheet welded to another I2 steel sheet
- heterogeneous welding: I2 steel sheet welded to steel sheets R2 or R5. In this case, I2 steel (C=0.091%) is assembled with steels having higher C content (0.22% for R1 and 0.34% for R5)

In all cases, the ablation performed before welding made it possible to achieve aluminum content in the weld metal lower than 0.3%. Thus, formation of intermetallic compounds was avoided and the complete transformation of the weld metal into austenite, before press hardening, was achieved. All the welded joints were heated and press hardened according to condition A of table 2, so to manufacture press hardened Laser welded steel parts. Thus, the different elements of the welded joints (base steels sheets surrounding the weld, and the weld itself) were press hardened in the same operation. Tensile specimens were machined in the direction transverse to the welds and in the adjacent base steels. Results of the welds have been compared with the ones of the adjacent base steels.

TABLE 6

Results of tensile tests performed on press hardened welds

| Press hardened weld combination | Results |
|---|---|
| I2 + I2 | TS - 1150 MPa |
| I2 + R2 | Similar strength of the weld as the one of I2 + I2 |
| I2 + R5 | Similar strength of the weld as the one of I2 + I2 |

Thus, provided that the Al—Si welds contain less than 0.3% Al, the steel sheet according to the invention can be welded to steel sheets with C content up to 0.34% without risk of embrittlement.

Example 4

The steel I1 has been provided and press hardened in the condition B of table 2, so to manufacture parts having various "omega" shapes. This made it possible to obtain zones with a small deformation amount (εb<0.05), and zones wherein εb=0.18. The latter zones correspond to stress concentration in use conditions.

Specimens have been cut out from these parts and etched with Nital so to reveal the microstructure. These specimens have been observed by Electron Microscope with a Field Emission Gun, at magnification of 5000 and 10000. The observed zones are mainly composed of martensite (fresh or self-tempered) and bainite. The average size of the lath width of the martensite and bainite (i.e. without distinguishing these two constituents) was determined by the method of intercepts. Furthermore, Vickers Hardness measurements have been performed in the different zones.

The results are presented in table 7.

TABLE 7

Average lath width

| | Average lath width (micrometers) | Vickers hardness (HV1) |
|---|---|---|
| εb < 0.05 | 2.09 | 375 |
| εb = 0.18 | 0.82 | 350 |

The strained zone shows hardness decrease of 25 HV. As estimated from this hardness value, the UTS of this strained zone is about 1050 MPa, which fulfills the requested value.

Regarding average lath width, the strained zone displays a reduction of more than 50% as compared to the little strained or unstrained zones. Thus, the finer lath structure in the deformed zones makes it possible to achieve increased toughness in the zones that are the most critical during the use of the part.

Thus, the steel parts manufactured according to the invention can be used with profit for the fabrication of structural or safety parts of vehicles.

What is claimed is:

1. A process for manufacturing a press hardened laser welded steel part, comprising the successive steps of:
   providing at least one first steel sheet with a composition containing, by weight:
   $0.062 \leq C \leq 0.095\%$;
   $1.4\% \leq Mn \leq 1.9\%$;
   $0.2\% \leq Si \leq 0.5\%$;
   $0.020\% \leq Al \leq 0.070\%$;
   $0.02\% \leq Cr \leq 0.1\%$;
   wherein: $1.5\% \leq (C+Mn+Si+Cr) \leq 2.7\%$;
   $0.040\% \leq Nb \leq 0.060\%$;
   $3.4 \times N \leq Ti \leq 8 \times N$;

wherein: 0.044% ≤(Nb+Ti)≤0.090%;
0.0005≤B≤0.004%;
0.001% ≤N≤0.009%;
0.0005% ≤S≤0.003%;
0.001% ≤P≤0.020%; and
a remainder being Fe and unavoidable impurities, the at least one first steel sheet precoated with a metallic precoating of aluminum, or aluminum-based alloy, or aluminum alloy;

providing at least one second steel sheet with a composition containing, by weight, from 0.065 to 0.38% of carbon, the at least one second steel sheet precoated with a metallic precoating of aluminum, or aluminum-based alloy, or aluminum alloy;

removing a portion of a thickness of the aluminum precoating at upper and lower sides along one side of a periphery of the at least one first steel sheet and the at least one second steel sheet;

creating a welded blank by laser welding the at least one first steel sheet and the at least one second steel sheet, such that an aluminum content in a weld metal is lower than 0.3% by weight, the laser welding being performed along the periphery wherein the portion of the thickness of the aluminum precoating has been removed;

heating the welded blank and holding the welded blank at a temperature Tm between 89° and 950° C., a holding duration Dm at the temperature being between 1 and 10 minutes, so as to obtain a heated welded blank;

transferring the heated welded blank within a forming press, the transfer duration Dt being less than 10 s;

hot forming the heated welded blank in the forming press so as to obtain a welded formed part; and cooling the welded formed part at a first cooling rate CR1 between 4° and 360° C./s in a temperature range between 75° and 450° C., and at a second cooling rate CR2 between 15 to 150° C./s in a temperature range between 450° C. and 250° C., wherein CR2<CR1.

2. The process as recited in claim 1 wherein the holding duration Dm is between 1 and 6 minutes.

3. The process as recited in claim 1 further comprising extracting the heated welding blank from a heating device prior to the transferring.

4. The process as recited in claim 1 wherein the composition of the first steel sheet includes, by weight, 0.0001% ≤Ca≤0.003%.

5. The process as recited in claim 1 wherein the removing is via laser ablation.

6. The process as recited in claim 5 wherein the laser ablation is performed through a YAG laser.

7. The process as recited in claim 6 wherein the laser ablation is performed at 4 kW with a focus spot of 1 mm².

8. The process as recited in claim 1 wherein the laser welding is performed with a 4 kW YAG laser.

9. The process as recited in claim 8 wherein the laser welding is performed under Helium protection.

10. The process as recited in claim 1 wherein the composition of the first steel sheet includes, by weight, 1.7% ≤(C+Mn+Si+Cr)≤2.3%.

11. The process as recited in claim 1 wherein the composition of the first steel sheet includes, by weight, 0.065% ≤C≤0.095%.

* * * * *